Patented July 7, 1942

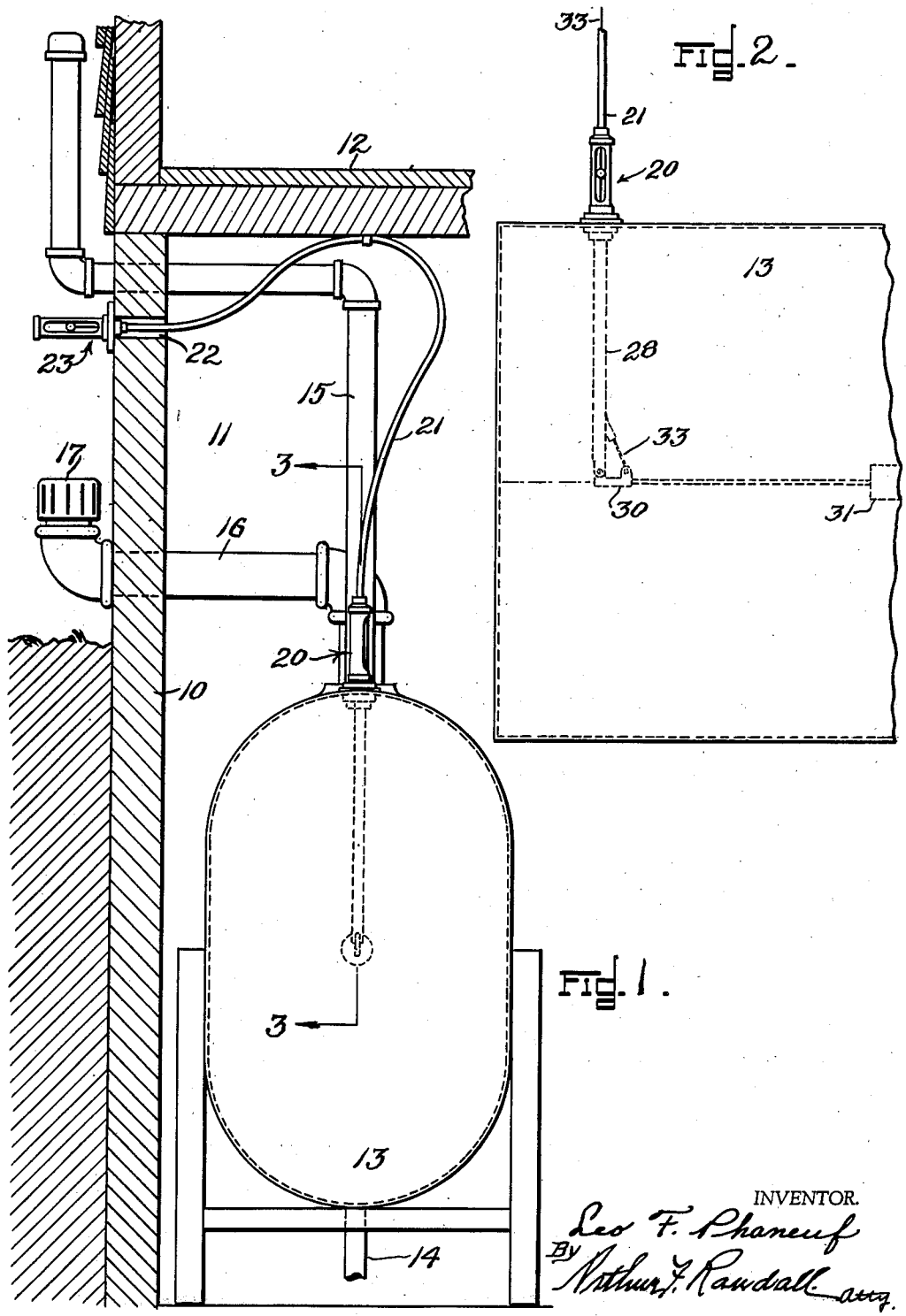

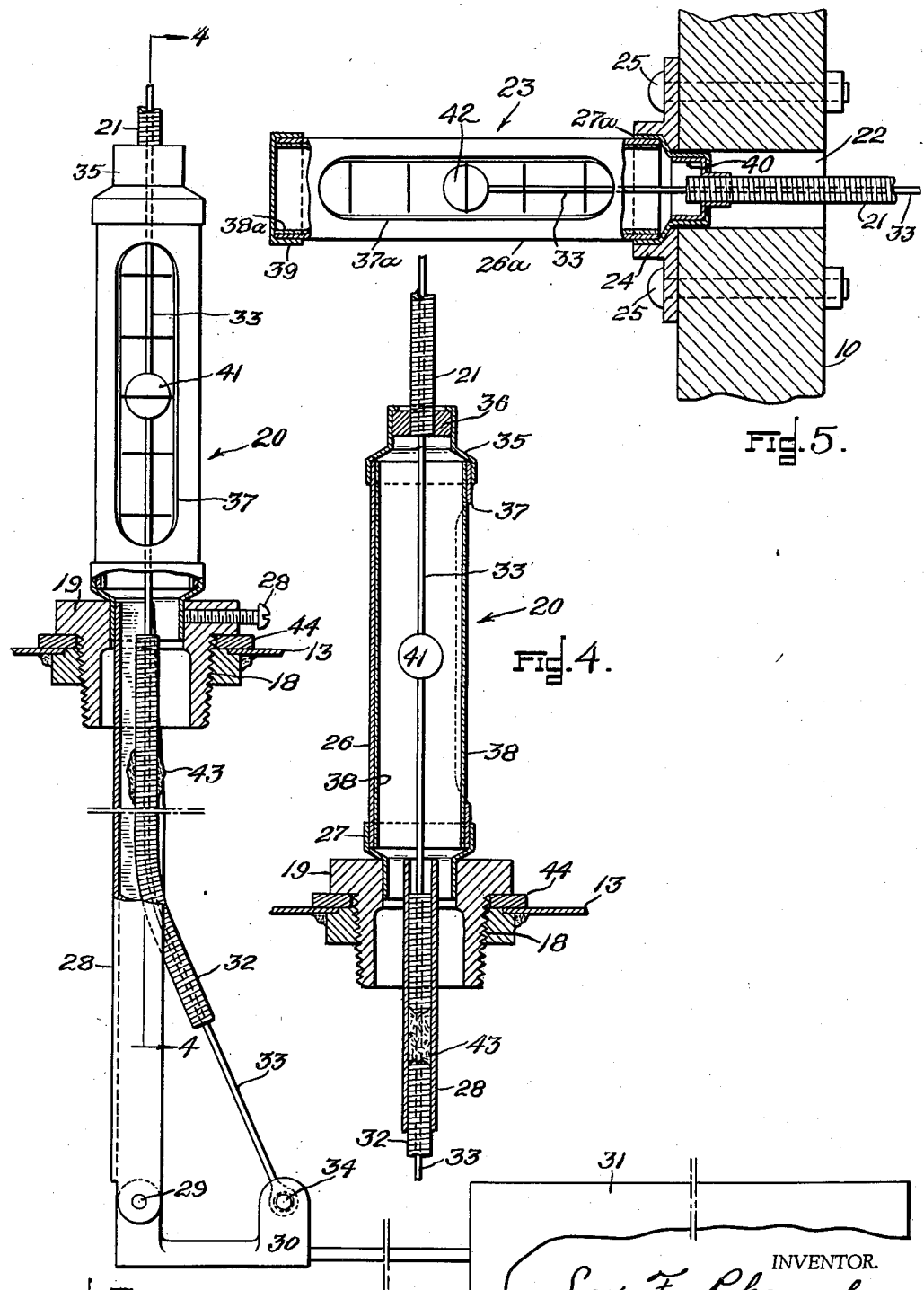

2,289,294

UNITED STATES PATENT OFFICE 2,289,294

LEVEL INDICATOR FOR STORAGE TANKS

Leo F. Phaneuf, New Bedford, Mass.

Application August 27, 1940, Serial No. 354,333

4 Claims. (Cl. 73—318)

My invention relates to improvements in gauge apparatus for fuel supply reservoirs such as are disposed within a building and equipped with means for filling the same from the outside of the building.

An object of the invention is to provide an improved gauge apparatus of the class indicated which will at all times disclose or indicate to an occupant of the building, and also to a person upon the outside of the latter, the amount of oil that is within the reservoir.

It is also an object of this invention to provide a gauge apparatus of the character just described which will be of simple, inexpensive and efficient construction.

To these ends I have provided an improved gauge apparatus of the class described having the features of construction and operation set forth in the following description, the several novel features of the invention being separately pointed out and defined in the claims at the close of said description.

In the accompanying drawings—

Figure 1 is a vertical sectional view of a portion of a building containing a fuel supply reservoir provided with a gauge apparatus constructed in accordance with my invention.

Figure 2 is a side elevation of one end of the tank shown in Fig. 1.

Figure 3 is a section on line 3—3 of Fig. 1, drawn on larger scale.

Figure 4 is a section on line 4—4 of Fig. 3.

Figure 5 is a view, partly in section and partly in elevation, illustrating the construction of the terminal fitting, hereinafter described, that is provided upon the exterior of the building.

In the accompanying drawings, 10 represents one of the walls of a building, 11 a basement or cellar and 12 the first floor of the building. Within the room 11 is arranged a fuel oil reservoir 13 from which fuel oil is withdrawn through a pipe 14 for use within the building.

Reservoir 13 is provided, as usual, with a vent pipe 15 and filler pipe 16 leading to the exterior of the building, the outer end of pipe 16 being normally closed by a removable cap 17.

The reservoir 13 ordinarily has a capacity of several hundred gallons and when the supply of oil within the same is to be replenished, it is customary to convey the oil to the building in a tank wagon or truck from which the oil is delivered through a hose into the outer end of the filler pipe 16 to which said hose is attached after removal of cap 17.

In accordance with my invention, the reservoir 13 is constructed at its top (Figs. 3 and 4) with a threaded hole 18 into which is screwed an exteriorly threaded flanged nipple 19 forming part of a terminal fitting 20 provided at one end of a flexible tubular metallic sheath 21.

This tubular sheath extends upwardly from fitting 20 through an opening 22 in wall 10 (Figs. 1 and 5) to the outside of the latter where its outer end is provided with a terminal fitting 23.

The fitting 23 is made with a flanged base 24 fastened in position upon the outside of wall 10 by bolts 25 while the flanged nipple 19 serves as a base for the fitting 20.

The fitting 20 comprises a tubular metallic body 26, one end of which is telescopically fitted within one end of a sleeve 27 to which it is soldered or otherwise fastened so that the joint between the two is closed. The opposite end of sleeve 27 is telescopically fitted into the outer end of nipple 19 where it is fixed in position by a set screw 23 (Fig. 3). Shellac or other suitable cement is applied to sleeve 27 before inserting it into the nipple in order to seal the joint between the two.

The upper end of a channel leg 28 occupies the lower end of sleeve 27 and is rigidly fastened to the latter by welding or otherwise. Pivotally connected at 29 to the lower end of channel 28 is a lever 30 carrying a float 31.

Fastened in position within the channel 28 is a short metallic tubular sheath 32 through which extends a flexible shaft or wire 33 whose lower end is pivotally connected at 34 to float lever 30.

The upper end of the tubular metallic body 26 of fitting 20 is soldered or otherwise secured within the lower end of a sleeve 35 so that the joint between the two is closed. A collar 36 is likewise secured within the upper end of sleeve 35 and this collar is also soldered or otherwise secured in position upon the lower end of sheath 21 so that the joint between the two is closed.

At one side thereof the tubular body 26 is made with a window 37 in the form of a longitudinal slot and this window is closed by a tubular transparent member 38 fitted and cemented to the interior of said body.

The outside fitting 23 is similarly constructed with a tubular body portion 26a formed with a window 37a in the form of a longitudinal slot and provided with a transparent tubular lining 38a.

The outer end of tubular body 26a is soldered or otherwise secured within a closure cap 39 so that the joint between the two is closed. The inner end of the tubular body 26a is soldered or otherwise secured within one end of a sleeve 27a so that the joint between the two is closed. This sleeve is rigidly secured within a socket formed in base 24. Soldered or otherwise secured within the opposite end of sleeve 27a is a bushing 40 which is mounted upon and soldered to the upper end of the tubular sheath 21.

The shaft or wire 33 extends upwardly from the pivot 34 (Figs. 3 and 5) through the sheath section 32, inside fitting 20 and sheath 21 into the outside fitting 23.

Mounted upon the shaft or wire 33, within the inside fitting 20, is a level indicator element 41 and a similar level indicator element 42 is fixed in position upon the upper end of the shaft or wire 33 within the outside fitting 23. As herein shown the indicator elements 41 and 42 are in the form of small spheres fixedly mounted upon the shaft or wire 33 and, as will be clear, up and down movement of float lever 30, occasioned by changes in the level of the contents of reservoir 13, adjusts the indicator elements 41 and 42 simultaneously lengthwise with respect to the window slots 37 and 37a.

From the above description it will be clear that, at all times, an occupant of the building is informed by the inside fitting 20 as to the quantity of oil within the reservoir. Also, a person upon the outside of the building is informed by the outside fitting 23 as to the quantity of oil within the reservoir. It is also true that while the supply of oil within the reservoir is being replenished through the filler pipe 16, the truckman who is delivering the oil may avoid overloading said reservoir by stopping the delivery of oil when the indicator element 42 nears or reaches the outer end of the window slot 37a of the outside fitting. If desired, the transparent linings 38 and 38a may be calibrated opposite the window slots as shown.

As will be clear, the tubular sheaths 21 and 32 prevent buckling of the shaft or wire 33 and guide the latter in its endwise movement. It is also a fact that reservoir 13, inside fitting 20, sheath 21 and outside fitting 23 completely inclose the shaft or wire 33 so that there is no opportunity for the escape of vapors.

As indicated at 43 (Figs. 3 and 4) the short guiding section of sheath 32 is fastened by solder within the channel 28. Also a gasket of leather or the like 44 may be provided between the flange of nipple 19 and the reservoir 13.

What I claim is:

1. A gauge apparatus for a liquid fuel supply reservoir, said apparatus including, in combination, a hollow fitting mounted on said reservoir and communicating with the interior of the latter, said fitting being made with a window and provided with a transparent closure therefor; a tubular sheath whereof one end is connected with said fitting and communicates with the interior of the latter; a second hollow fitting located at a distance from said reservoir and with which the opposite end of said tubular sheath is connected so as to communicate with the interior thereof, said last mentioned fitting being also made with a window and provided with a transparent closure therefor; a float movably supported within said reservoir; a flexible shaft completely inclosed within said two fittings, said sheath and said reservoir; means through which said flexible shaft is adjusted endwise within said fittings and said sheath by movement of said float up and down in response to variations in the level of the liquid fuel within said reservoir, and two indicator elements carried by said flexible shaft each disposed within one of said fittings and exposed to view through the window thereof.

2. A gauge apparatus constructed in accordance with claim 1 wherein each of said fittings comprises a tubular body portion formed with a longitudinal window slot and a tubular lining of transparent material which serves as a closure for said slot and through which the indicator element of the fitting is visible from the exterior of the latter.

3. A gauge apparatus for a liquid fuel supply reservoir, said apparatus including, in combination, a hollow fitting mounted on said reservoir and communicating with the interior of the latter, said fitting being made with a window and provided with a transparent closure therefor; a tubular sheath whereof one end is connected with said fitting and communicates with the interior of the latter; a second hollow fitting located at a distance from said reservoir and with which the opposite end of said tubular sheath is connected so as to communicate with the interior thereof, said last mentioned fitting being also made with a window and provided with a transparent closure therefor; a lever within said reservoir pivotally supported by said first mentioned fitting; a float connected with said lever; a flexible shaft completely inclosed within said two fittings, said sheath and said reservoir, one end of said flexible shaft being directly connected with said lever so that it is adjusted endwise within said fittings and said sheath by said lever when the latter is swung on its pivot by said float in response to variations in the level of the liquid fuel within said reservoir, and two indicator elements on said flexible shaft each disposed within one of said fittings and exposed to view through the window thereof.

4. A gauge apparatus constructed in accordance with claim 3 and wherein said flexible shaft is pivotally connected at its one end with said lever.

LEO F. PHANEUF.